June 21, 1927.
W. P. HAMMOND
1,633,368
WIND DEFLECTOR
Filed Jan. 19, 1923
2 Sheets-Sheet 2
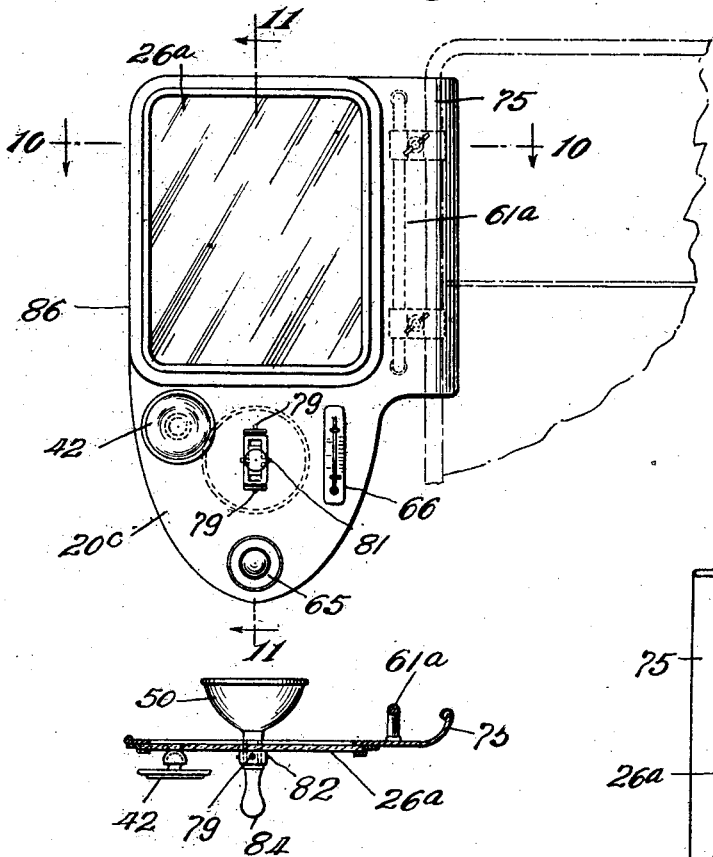
Fig. 9.
Fig. 10.
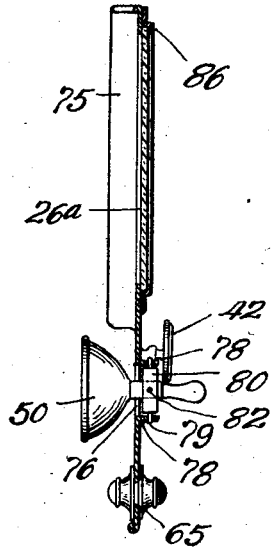
Fig. 11.
INVENTOR
William P. Hammond
BY
Moses, Hammond Morse & Nolte
ATTORNEYS.

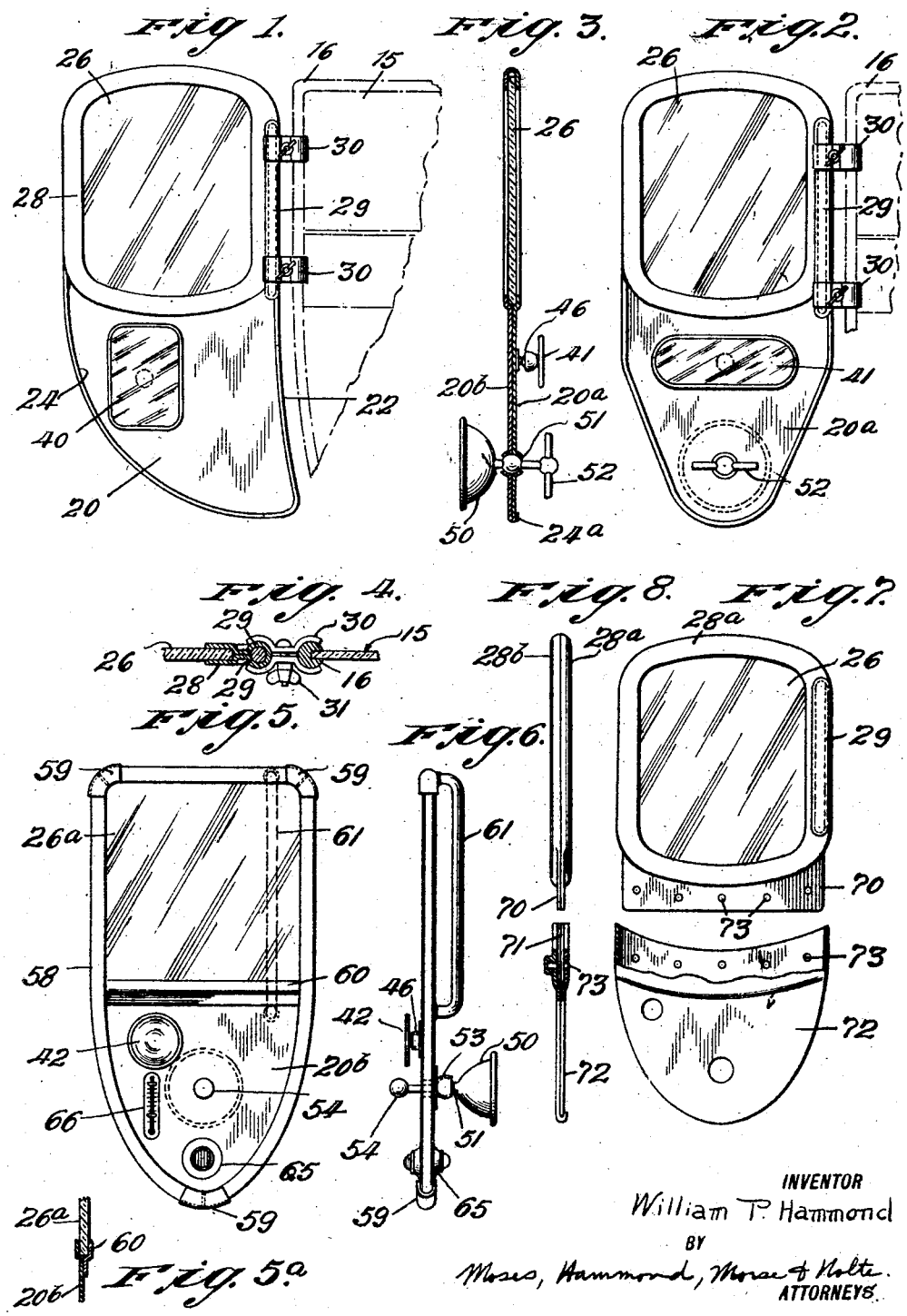

Patented June 21, 1927.

1,633,368

UNITED STATES PATENT OFFICE.

WILLIAM P. HAMMOND, OF EAST ORANGE, NEW JERSEY.

WIND DEFLECTOR.

Application filed January 19, 1923. Serial No. 613,574.

This invention relates to windshields and more especially to supplementary windshields of the type generally termed wings.

It is the purpose of the herein disclosed invention to provide windshields which will afford a most effective protection for motor vehicle occupants without possessing the fragility and liability to breakage inseparable from the glass shields heretofore employed, thus removing the ever present danger to the vehicle's occupants of flying glass from accidental breakage.

More especially, it is the object of this invention to provide such windshields, or wings, supplementary thereto, which will be adapted to provide a mounting for such instruments and devices, such as mirrors, spotlights, parking lights, usually supported upon brackets attached to the vehicle body or the windshield frame, in a more convenient and accessible position for the motor vehicle driver.

The windshields, both of the main body and wing type, previously provided have been constructed of glass sheets supported by bolts or in a frame of metal channel; obviously such glass sheets possessed little strength under impact, a sharp blow or sudden strain of very little real force being sufficient to fracture them and to send the fragments flying. In the case of an accident almost invariably the motor vehicle occupants were cut, often seriously, by the flying pieces of broken glass.

Such glass shields were at once difficult to manufacture, easily broken and of insufficient strength to safely support any of the devices or instruments provided for the convenience of the motor vehicle occupants, the value of such devices often being seriously detracted from by the inconvenience of the positions in which they must find mounting to avoid the windshield.

The herein disclosed invention provides means for eliminating the danger of flying glass, for greatly reducing the cost of manufacture, and for providing a shield which is of such strength that any or all of the instruments, or devices, incidental to motor car operation may be mounted thereon, also accomplishing many other advantages and simplifications in manufacture, mounting and use, as will appear from the following description and from the appended drawings, in which like numerals have been employed to indicate like parts throughout the several views.

Fig. 1 serves to illustrate one form of embodiment of my invention.

Fig. 2 shows a modified embodiment of the invention.

Fig. 3 is a sectional view of the embodiment shown in Fig. 2.

Fig. 4 is a top view of a detail of the embodiments shown in Figs. 1 and 2.

Fig. 5 is an elevation of a further modification of embodiment.

Fig. 5ª illustrates a detail of the device shown in Fig. 5.

Fig. 6 is a side, or edge, view of the embodiment shown in Fig. 5.

Fig. 7 serves to show one method of constructing a device embodying my invention.

Fig. 8 is an edge, or side, view of the device shown in Fig. 7.

Fig. 9 is an elevation of a further modification of embodiment.

Fig. 10 is a sectional view of the device shown in Fig. 9, on the line 10—10 looking in the direction of the arrows.

Fig. 11 is a sectional view of the device shown in Fig. 9 on the line 11—11 looking in the direction of the arrows.

In the device shown in Fig. 1, a portion of a motor vehicle windshield 15, shown by broken lines, is provided with a metal frame 16 which serves to support the improved form of wing shown in solid lines. It will be manifest that the wing could be equally well supported from any other part of the vehicle frame or body and that the windshield mounting is for illustrative purposes only.

In the improved wing shown, a shield 20 is formed from sheet metal to conform to the windshield and vehicle body, at its inner edge 22. This shield preferably has its edges turned over as at 24 to reinforce and stiffen it. The upper portion of the shield 20 is cut-away to receive a glass 26; a portion of the cut-away metal serving to form the frame 28, which secures the glass 26 in place, reinforcing and supporting it in such manner that plate glass may be dispensed with, ordinary single thickness glass serving equally well, as it is supported at all of its edges and is of relatively small area. Considering this point alone, a very considerable saving in cost and in weight is effected, while in the event of breakage the glass fragments are held and effectually prevented from being thrown about, thus adding safety features of considerable value.

A portion of the rib 24 is further formed into beads 29, one upon the rear and one upon the front of the wing. These beads 29 preferably have their surfaces shaped to the arc of a circle and afford gripping surfaces for the clamps 30, as is best seen from Fig. 4. Clamps 30 also serve to engage the windshield frame 16 and are clamped upon the windshield frame and the wing by means of the thumbnuts 31. The curved surfaces of the beads 29, and of the windshield frame 16, afford a considerable gripping surface for the clamps 30, permitting the wing to be adjusted vertically upon its support or swing at any desired angle thereto. When secured by the thumbnuts 31, however, it will be seen that the wing is securely held in any adjusted relationship to the windshield and is rigidly locked thereto.

The light weight of the metal wing greatly reduces the strain upon the windshield frame over that caused by a solid plate glass shield, while it will be evident that the metal to metal contacts now effected are much more positive and secure than any method of clamping, or bolting, of glass surfaces known to the prior art. The glass 26 is of ample area to serve all purposes of vision while so supported and reinforced to be almost unbreakable. The lower portion of the shield 20 serves as a convenient mounting point for the rear view mirror 40, which may be mounted thereupon by any form of adjustable, or non-adjustable, holder, an example of such a mounting being shown at 46 in Fig. 3.

In the embodiment shown in Fig. 2, the shield is formed from a rear member $20^a$ and a front member $20^b$, as will be seen in Fig. 3; these members are formed to cooperate to produce the frame of the glass 26 having the beads 29, and to encompass the ball joint 51, thus forming the support of the spotlight 50. The front member $20^b$ is preferably made slightly larger than the rear member $20^a$ and its edge $24^a$ is turned over after assembly, thus securing the members together and clamping the glass 26 and spotlight 50 in place. Spotlight 50 is further provided with a handle 52, which projects from the rear of the complete shield and serves as an easy method of manipulating the spotlight from the rear of the shield, the ball 51 affording movement for directing the spotlight beam in any desired direction. A rear view mirror 41 is also mounted upon this shield by such means as the ball joint 46, which allows of its adjustment independently of the shield adjustment when required.

Figs. 5 and 6 serve to show a further embodiment of my invention wherein a frame 58 is formed from sheet metal, or tubing, bent from a single section or made from several sections secured together by jointing pieces 59, a slot extending completely around the interior of the frame 58 serving to receive the glass $26^a$ in the upper portion of the frame and the metal shield $20^b$ in the lower portion. Shield $20^b$ may be constructed of double metal sheet, as in the device shown in Figs. 2 and 3, but is preferably constructed from a sheet of single thickness having an offset portion (as shown in Fig. $5^a$) for receiving the bottom of glass $26^a$, which is retained therein by a holding strip 60. The shield $20^b$ serves as a mounting for the rear view mirror 42, here shown as of the round type, mounted upon an adjustable joint 46 similar to that shown in Fig. 3. A spotlight 50 is supported by a clamp 53 fastened to the shield $20^b$ and engaging the ball joint 51 of the spotlight handle 54, which serves all of the purposes described for handle 52 in Figs. 2 and 3.

A further opening in the shield $20^b$ serves to receive the parking light 65, which serves as a warning to protect the motor vehicle from front and rear when desired. A thermometer, or barometer, 66 is also mounted upon the shield $20^b$ for the convenience of the vehicle operator.

This form of my invention is most conveniently supported by a bar 61 secured to the frame 58 at its upper end and to the shield $20^b$ at its lower extremity. This bar 61 is easily gripped by such means as the clamps 30 which support the complete device in position upon the vehicle. The location of bar 61, somewhat removed from the edge of the wing, allows the wing to overlap the main windshield, if used in conjunction therewith, thus preventing the entrance of the elements through such an opening as that shown in Fig. 1 between the inner wing edge 22 and the windshield frame 16.

The improved wing may also be constructed as is shown in Figs. 7 and 8, wherein the upper part, holding the glass 26, is formed from cooperating pressed metal sections $28^a$ and $28^b$ terminating at their lower portions in a tongue piece 70 adapted to engage a slot 71 in a lower shield portion 72, which provides a mounting means for the instruments and devices in the same manner as the shields 20, $20^a$ and $20^b$ previously described. Rivets or bolts, not shown, may engage the holes 73 to retain the tongue 70 in the slot 71.

This method of providing a detachable lower shield permits of merely changing this shield when it is desired to provide a different shape of shield or a different form of instrument mounting, the top portion being universally engageable with several forms of lower shield, such as the forms shown in the other figures of the present drawings.

In the further embodiment shown in Figs. 9, 10 and 11, a single sheet of metal forms the shield 20ᶜ with a projecting portion 75 which serves to overlap the vehicle body, or main windshield, in such manner as to effectually cut off drafts, while the glass 26ᵃ has its entire area unobstructed and available for vision.

The portion 75 also serves as a mounting for the bar 61ᵃ which serves to support the wing as described for bar 61 in Figs. 5 and 6. This bar 61ᵃ has been shown in dotted lines in Fig. 9, and as being on the front of portion 75 in Fig. 10, but it will be understood that it may be located upon the front or rear of the portion 75 and accomplish the wing mounting while permitting of the adjustments required.

The single sheet which serves to form the shield 20ᶜ and the portion 75 has also an opening 76 for supporting the spotlight 50. The metal displaced when cutting the opening 76 is bent into lugs 78 which receive the pins 79 on either end of the block 80; block 80 is slotted to receive the flattened shank of the spotlight 50 in such manner that it may swing vertically upon the pin 82. The pivoting of block 80 upon pins 79, and of the spotlight shank upon the pin 82, affords the operator grasping the spotlight handle 84 universal movement permitting the direction of the spotlight beam in any desired direction.

The glass 26ᵃ is retained in place by such means as a recessed frame 86, which may be welded or bolted to the shield 20ᶜ.

The improvements shown and described will be seen to be of such nature that all of the metal parts shown may be easily, quickly and economically made from sheet metal by simple punching and pressing operations. Where parts are joined together, joints have been provided of such a form, and so located, that welding, or brazing, may replace the costly machine work necessary to other forms of connection. The use of sheet metal permits of a strong but light construction obtainable in no other way, while the one piece, and welded, product eliminates the rattling and early destruction other forms of construction meet with when undergoing the severe vibrations incidental to motor vehicle operation.

It will be seen that provision has been made for the complete elimination of the numerous brackets, clamps, and arms, formerly required to support such conveniences and necessities as the spotlight, parking light and rear view mirror, that here again an important economy in cost, and in space required, has been effected, while at the same time adding greatly to the convenience of operation and to the neat appearance of the motor vehicle.

Manifestly many changes and modification in shape, in relationship, in manufacture, and in attachment of the various parts, or of the complete device, may be made without departing from the spirit of my invention or the scope of the appended claims; and while only a few of the instruments and devices necessary, or convenient, to motor car operation have been shown as mounted on the improved wing, such wing may serve as the support for many others not shown herein.

It should also be understood that while the invention has been described as cooperating with the vehicle windshield or body, it is yet capable of fulfilling all of its functions independently of such cooperation.

I claim as my invention:—

1. A wind deflector for motor vehicles comprising a sheet of transparent material too thin to sustain a driving accessory thereon, a metal frame surrounding and supporting said sheet to add strength and rigidity to the deflector and having an integral portion of substantially greater area than the remainder of said frame extending below the transparent material to provide a support for driving accessories.

2. A wind deflector for automobiles, comprising a flat sheet metal body having a sight opening therein, means to support said deflector adjacent the automobile wind-shield, a glass in said opening, and an integral area of said metal body of substantial size outside said opening for supporting driving accessories.

3. A wind deflector for automobiles comprising an integral sheet metal plate having a sight opening therein, means to support said plate adjacent the automobile windshield, a glass in said opening, and an integral flat portion of said sheet metal plate of substantial area below said opening adapted to support driving accessories.

In testimony where I have affixed my signature to this specification.

WILLIAM P. HAMMOND.